United States Patent [19]

Takei et al.

[11] Patent Number: 5,722,724
[45] Date of Patent: Mar. 3, 1998

[54] VEHICLE SEAT WITH A RETRACTABLE SUB VEHICLE SEAT

[75] Inventors: Yasuchika Takei; Masami Yoshida; Tomomi Shouji, all of Tochigi-ken, Japan

[73] Assignee: Tokyo Seat Co., Ltd., Saitama-ken, Japan

[21] Appl. No.: 731,988

[22] Filed: Oct. 23, 1996

[30] Foreign Application Priority Data

Oct. 24, 1995 [JP] Japan .................. 7-298976

[51] Int. Cl.⁶ .................................. B60N 2/30
[52] U.S. Cl. .................... 297/238; 297/344.13; 297/114
[58] Field of Search ................... 297/238, 237, 297/236, 125, 112, 114, 146, 344.13, 377

[56] References Cited

U.S. PATENT DOCUMENTS

| | | | |
|---|---|---|---|
| 2,481,943 | 9/1949 | Murphy et al. | 297/238 |
| 3,094,354 | 6/1963 | Bernier | 297/112 |
| 4,541,654 | 9/1985 | Jonasson | 297/238 |
| 4,655,503 | 4/1987 | Kamijo et al. | 297/238 |
| 5,169,209 | 12/1992 | Beroth | 297/146 |
| 5,322,344 | 6/1994 | Hoffman et al. | 297/238 |

FOREIGN PATENT DOCUMENTS

| | | | |
|---|---|---|---|
| 492281 | 7/1992 | European Pat. Off. | 297/146 |
| 78722 | 7/1962 | France | 297/344.13 |
| 62-24581 | 6/1987 | Japan | |

Primary Examiner—Milton Nelson, Jr.
Assistant Examiner—Anthony D. Barfield
Attorney, Agent, or Firm—Browdy and Neimark

[57] ABSTRACT

A vehicle seat comprises a main seat portion, a main backrest rotatably attached to the main seat portion, and a retractable sub vehicle seat. The sub vehicle seat has a recess formed on a rear side of the main backrest, a sub backrest rotatably attached to the main backrest, and a locking mechanism for holding the sub backrest on a retracted position or an upright position. The main backrest has a frame assembly rotatably attached to the main seat portion, a front cushion section attached to a front side of the frame assembly, and a rear cushion section attached to a rear side of the frame assembly. The rear cushion section is positioned in a bottom of the recess for supporting buttocks of a passenger who sits on the recess. The rear cushion section has a dent portion for supporting the buttocks and a bulged portion for supporting thighs of the passenger. The locking mechanism comprises a locking plate having a first groove and a second groove fixed to the sub backrest, and a locking spring attached to the main backrest and selectively engaged with the first groove and the second groove.

11 Claims, 9 Drawing Sheets

VEHICLE SEAT WITH A RETRACTABLE SUB VEHICLE SEAT

BACKGROUND OF THE INVENTION

1. Field of the Invention

The present invention relates to a vehicle seat, and more particularly to a vehicle seat having a retractable sub vehicle seat disposed on a backrest of the vehicle seat.

2. Description of the Related Art

There is publicly known a vehicle seat having a retractable sub vehicle seat at a rear side of a backrest thereof. For example, Japanese Utility Model Publication No. 62-24581 describes a vehicle seat which comprises a main seat portion attached to a vehicle body, a main backrest rotatably attached to the main seat portion, and a retractable sub vehicle seat which has a recess for receiving buttocks of a passenger formed on a rear side of the main backrest and a sub backrest rotatably attached to the main backrest. The sub backrest is rotatable between a retracted position in which it is substantially in parallel to the main backrest and an upright position in which it is substantially perpendicular to the main backrest. The sub backrest is adapted to be accommodated within the recess when retracted. The sub vehicle seat further has a locking mechanism for holding the sub backrest on the retracted position or the upright position.

The above-mentioned prior art vehicle seat has some disadvantages. The first disadvantage resides in that since there is provided no cushion of a suitable thickness on a bottom face of the recess for supporting the buttocks of the passenger, the sub vehicle seat is uncomfortable to sit on. The second disadvantage resides in that since the sub backrest is held at the upright position only by the locking mechanism, the locking mechanism has to be strongly-built. Further, the strongly-built locking mechanism is large-sized, so that the sub backrest is made thick. With the thickness of the sub backrest, the cushion of the main seat portion becomes thinner, which brings about in an uncomfortable feeling of sitting on the main seat portion. The third disadvantage resides in that the conventional main seat portion comes into contact with a dashboard of the vehicle when the vehicle seat is slid forward.

SUMMARY OF THE INVENTION

It is, therefore, an object of the present invention to provide a vehicle seat having a retractable sub vehicle seat, which is capable of resolving the above-mentioned problems.

DETAILED DESCRIPTION OF THE PREFERRED EMBODIMENT

Figure 1:
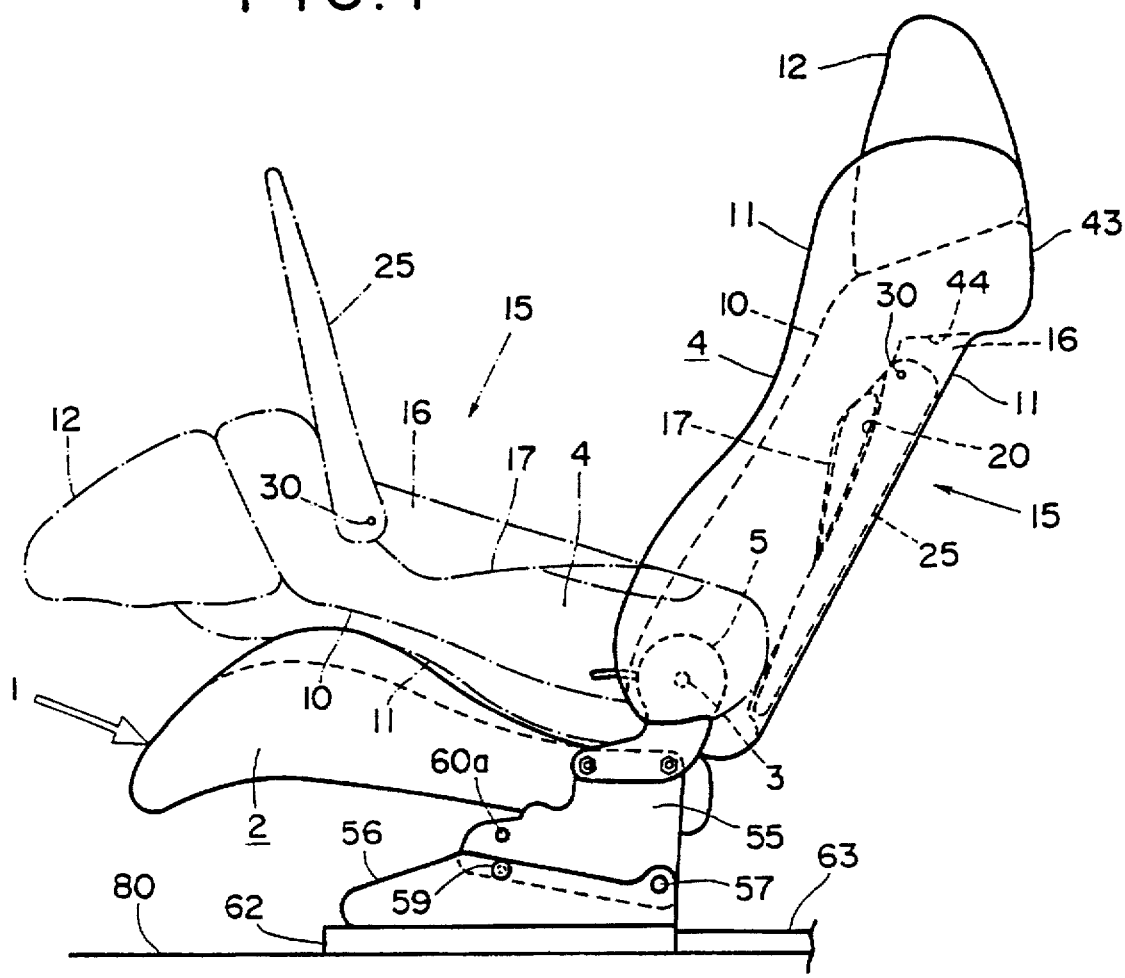
FIG. 1 is a side view of a vehicle seat according to the present invention.

Referring to the drawings, as shown in FIG. 1, a vehicle seat 1 according to an embodiment of the present invention has a main seat portion 2 slidably attached to a vehicle body 80, a main backrest 4 rotatably attached to the seat portion 2 by a shaft 3, a headrest 12 attached to an upper portion of the backrest 4, and a reclining device 5 for adjusting an inclination angle of the backrest 4 with respect to the main seat portion 2.

Figure 4:
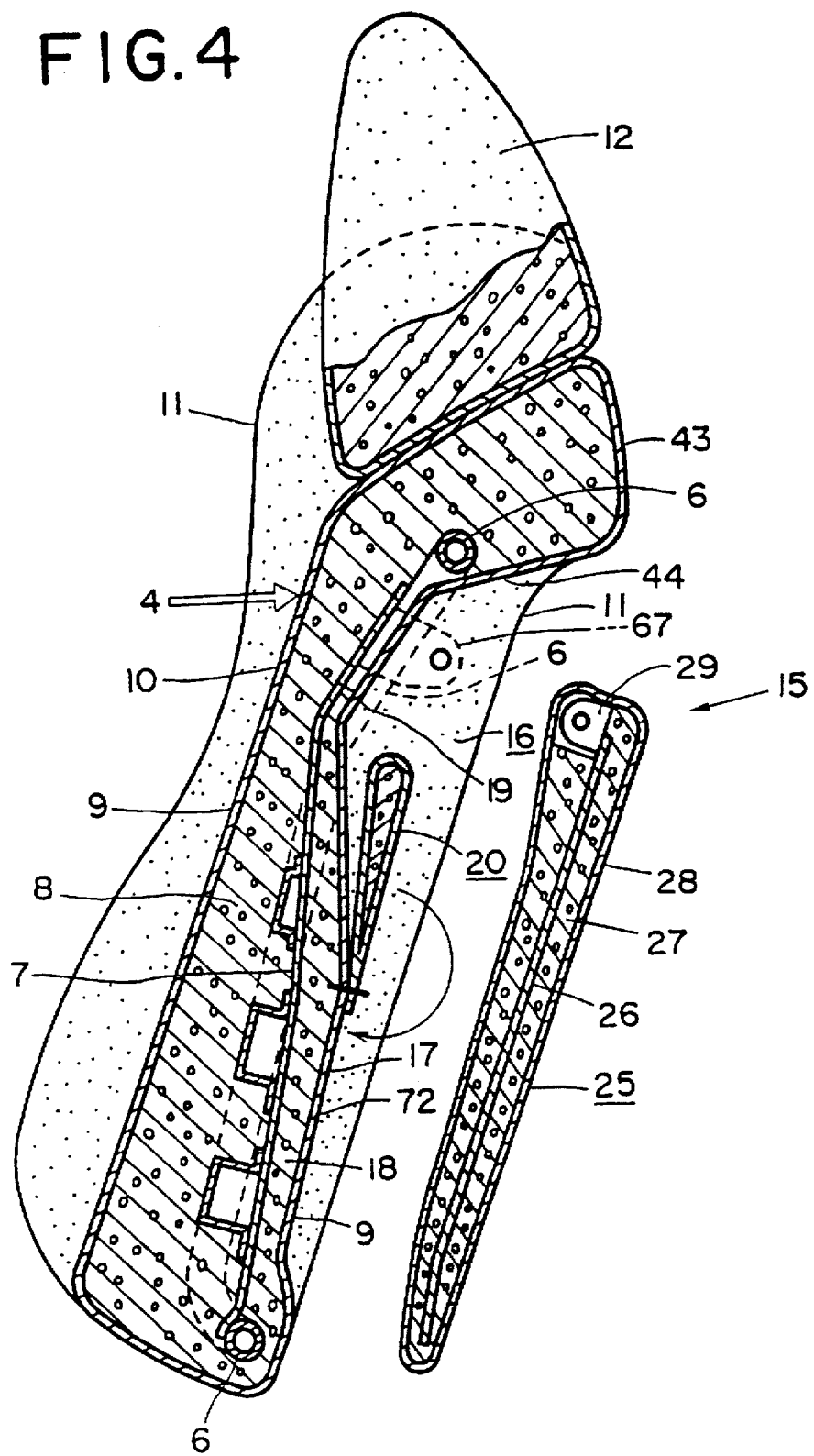
FIG. 4 is a sectional view of a main backrest and a retractable sub vehicle seat.
Figure 5:
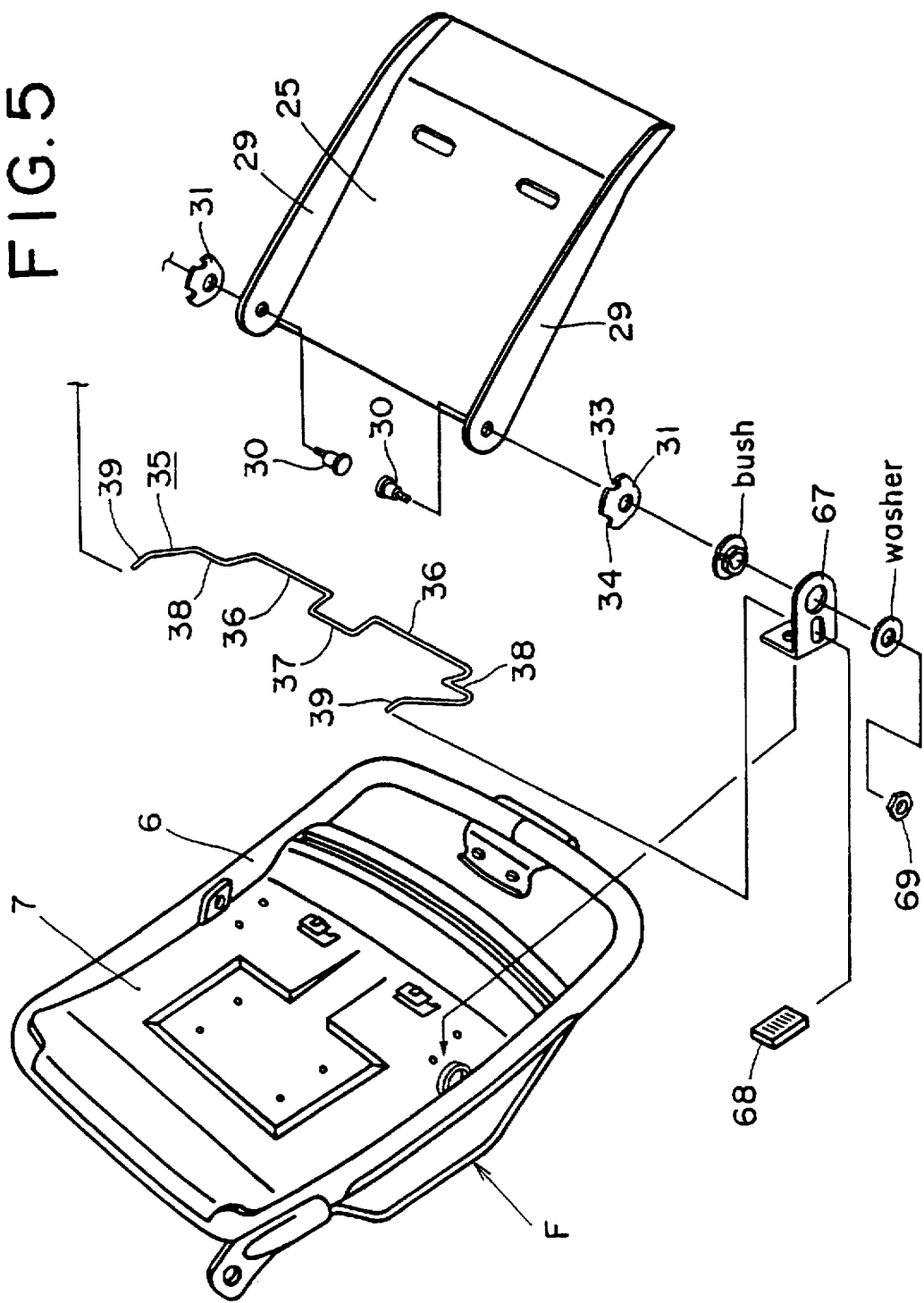
FIG. 5 is an exploded perspective view of a frame assembly of the main backrest and a frame of a sub backrest.

The backrest 4 is comprised of a central supporting portion 10 for supporting a back of a passenger who sits on the main seat portion 2 and side supporting portions 11 disposed on both sides of the central portion 10. Inside the central supporting portion 10 are disposed a frame assembly F comprised of a pipe frame 6 preferably shaped in rectangular frame and a vertical supporting plate 7 fixed to an inside of the pipe frame 6 as shown in FIGS. 4 and 5. The frame assembly F is surrounded by a front cushion 8 and a rear cushion 18 which are made of urethane, etc., and enclosed by respective outer skins 9.

Figure 2:
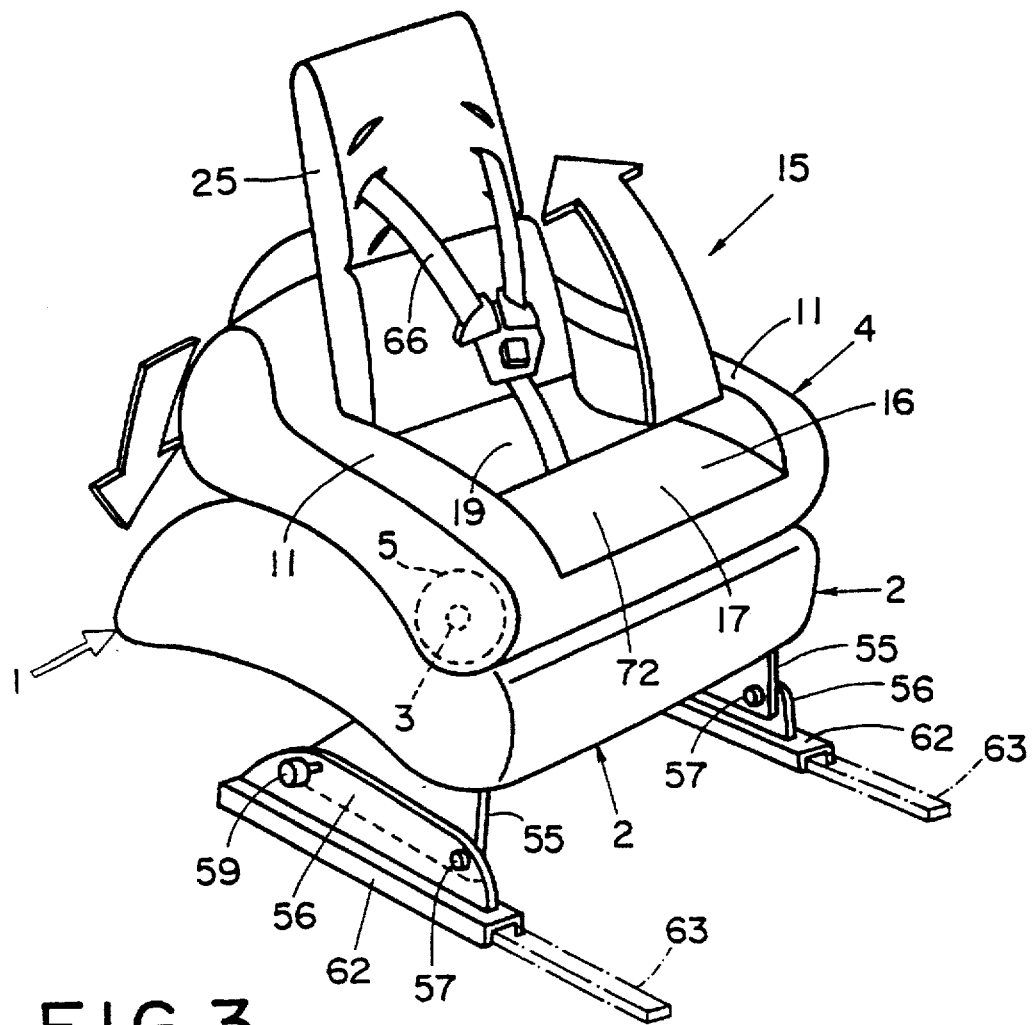
FIG. 2 is a perspective view of the vehicle seat.
Figure 3:
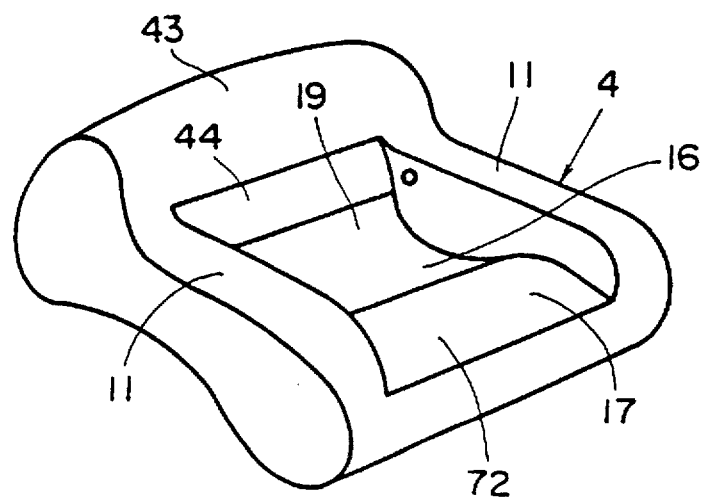
FIG. 3 is a perspective view of a main backrest.

The main backrest 4 has a retractable sub vehicle seat 15 at a rear side thereof. The sub vehicle seat 15 is comprised of a recess 16 disposed on a rear side of the main supporting portion 10, a sub backrest 25 rotatable between a retracted position in which the sub backrest 25 is substantially in parallel with the main backrest 4 and is accommodated within the recess 16 and an upright position in which the sub backrest 25 is substantially perpendicular to the main backrest 4, and a seat belt 66. The recess 16 has a size in which a passenger such as a child can sit thereon with its face backward, while the main backrest 4 is rotatably moved forward to thereby be substantially in parallel with the main seat portion 2, as shown in FIGS. 1 and 2. The side supporting portions 11 are located on both sides of the recess 16, then used as arm rests of the sub vehicle seat 15. A bottom of the recess 16 constitutes a sub seat portion 17 of the sub vehicle seat 15.

Figure 6:
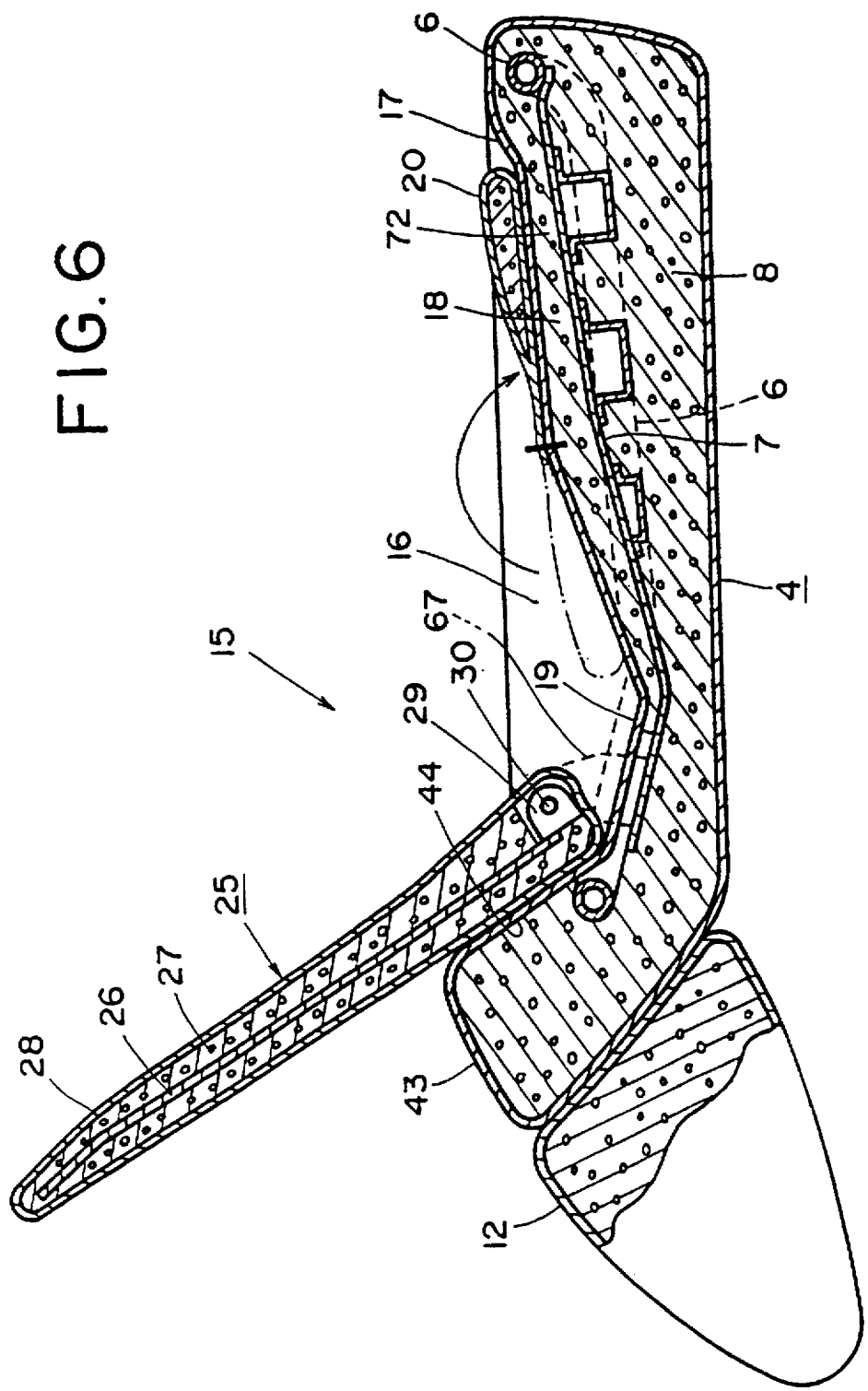
FIG. 6 is a sectional view of the main backrest of a horizontal state and the sub backrest at an upright position.
Figure 7:
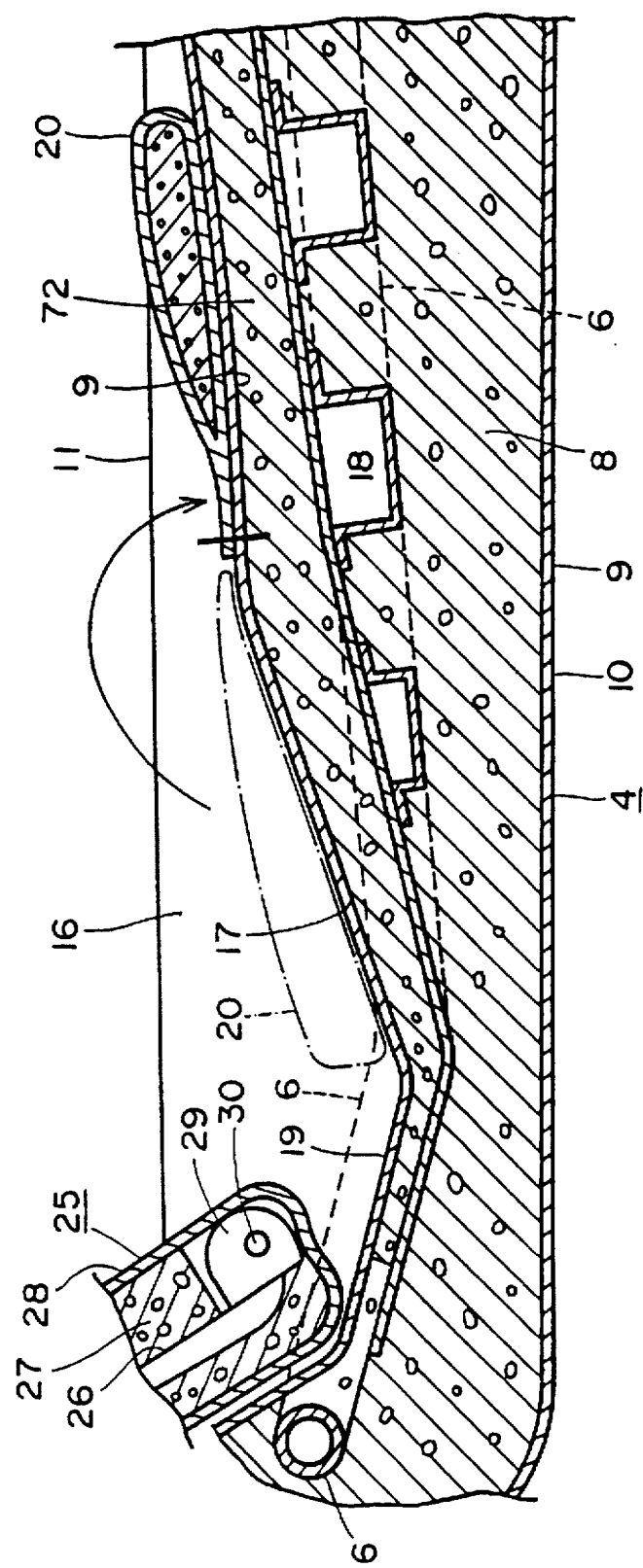
FIG. 7 is an enlarged sectional view of a part of FIG. 6.

A dent portion 19 for supporting the buttocks of the passenger and a bulged portion 72 for supporting femoral regions of the passenger are formed on the sub seat portion 17. However, when the thickness of the rear cushion 18 of the sub seat portion 17 is insufficient to form the suitable bulged portion 72, a separate cushion pad 20 can be used therefor. In the present invention, as shown in FIG. 6, the cushion pad 20 for supporting the femoral regions of the passenger is sewed on the sub seat portion 17 by a string. The cushion pad 20 has such a thickness as to be thin at a base portion thereof and becomes thicker toward a leading end thereof, as a wing of an air plane. The cushion pad 20 is retracted in the dent portion 19 while rotating with the sewed portion thereof as a center when retracting the sub backrest 25 in the recess 16. The cushion pad 20 may be detachably attached thereto by a magic tape, etc.

The sub backrest 25 is constituted by a plate-like frame 26, a cushion 27 such as urethane surrounding a frame 26, and an outer skin 28 enclosing the cushion 27. A pair of flanges 29 are disposed on both sides of the frame 26, then the flanges 29 and brackets 67 fixed to the frame assembly F are rotatably connected to each other by bolts 30 and nuts 69.

Figure 8:
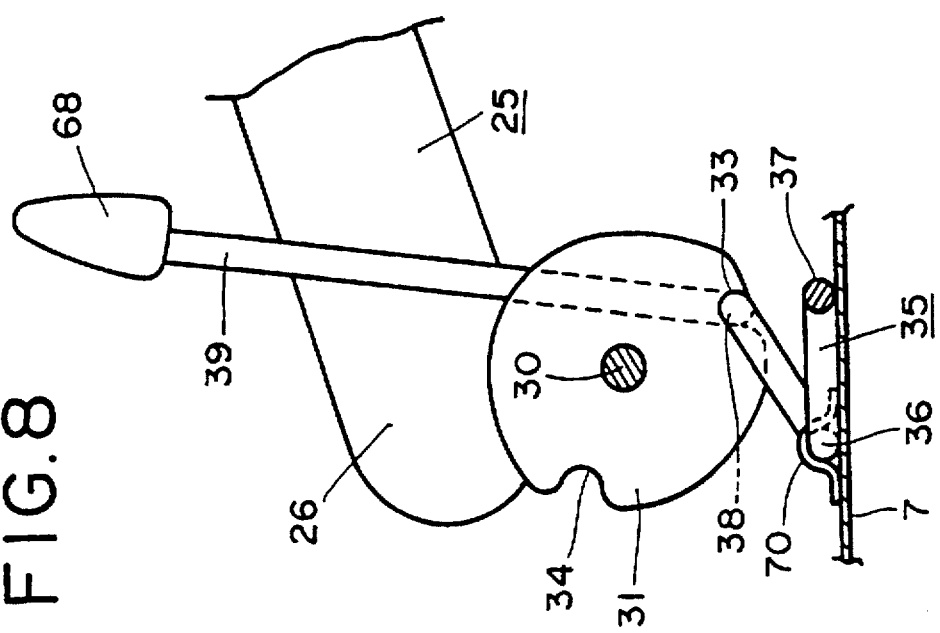
FIG. 8 is a side view of a locking mechanism in which the sub backrest is positioned on a retracted position.
Figure 9:
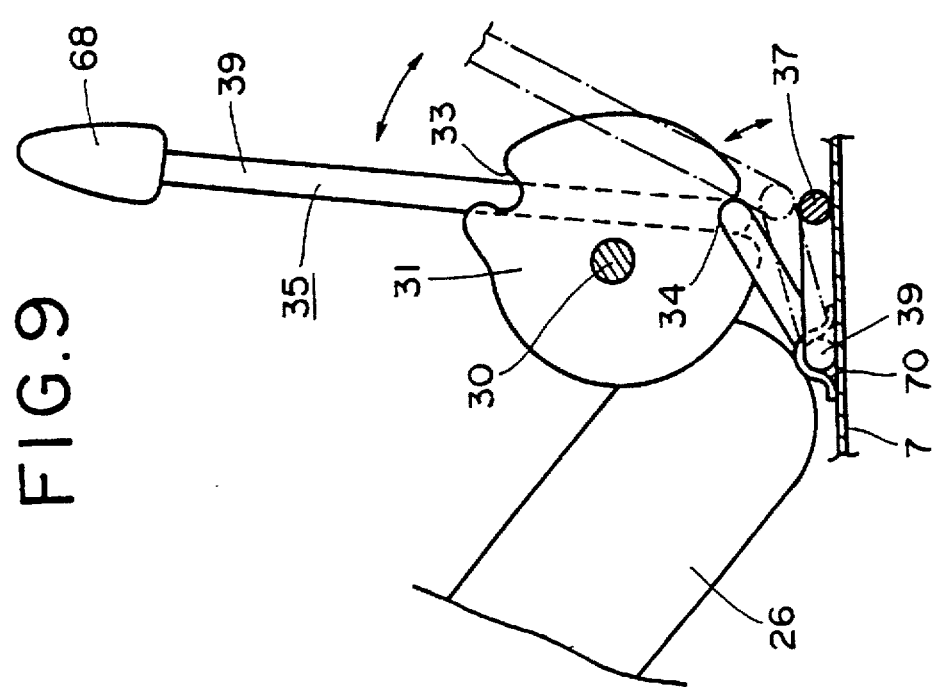
FIG. 9 is a side view of the locking mechanism in which the sub backrest is positioned on the upright position.

As shown in FIG. 5, a locking spring 35 is disposed on a rear face of the vertical supporting plate 7. The locking spring 35 has a pair of attaching portions 36 attached to the vertical supporting plate 7 by fasteners 70 (FIG. 8), a pair of contacting portions 37 resiliently coming into contact with the vertical supporting plate 7, and a pair of engaging portions 38 engaging with a pair of locking plates 31 fixed to the frame 26. One of the outer ends 39 of the engaging portions 38 protrudes toward the outside of the main backrest 4 through the bracket 67, then operating knob 68 is attached to the exposed outer end 39. Each locking plate 31 has a first groove 33 engaging with the engaging portion 38 of the locking spring 35 when the sub backrest 25 is displaced to the retracted position as shown in FIG. 8, and a second groove 34 engaging with the engaging portion 38 when the sub backrest 25 is displaced to the upright position as shown in FIG. 9. The engaging portions 38 are adapted to separate from the locking plates 31 when turning the operating knob 68, then the sub backrest 25 is adapted to freely rotate.

As shown in FIG. 4, an upper portion 43 of the main backrest 4 to which the headrest 12 is attached has a supporting wall 44 coming into contact with a rear or outer surface of the sub backrest 25 when the sub backrest 25 is displaced to the upright position. In the present invention, since the supporting wall 44 receives the load applied to the sub backrest 25, the load applied to the locking plates 31 and the locking spring 35 which hold the sub backrest 25 at the upright position is reduced. Therefore, the locking plates 31 and the locking spring 35 do not need a strongly-built teeth member and a strongly-built ratchet member, and can be miniaturized to a relatively simple construction. Further, since the locking plates 31 and the locking spring 35 are miniaturized, which brings about the thin sub backrest 25, accordingly two of the cushions 8, 18 of the main seat portion 2 are made thick, which results in the comfortable feeling of sitting thereon. The angle of the supporting wall 44 is suitably designed according to the intended purpose of the retractable sub vehicle seat 15.

Figure 10:
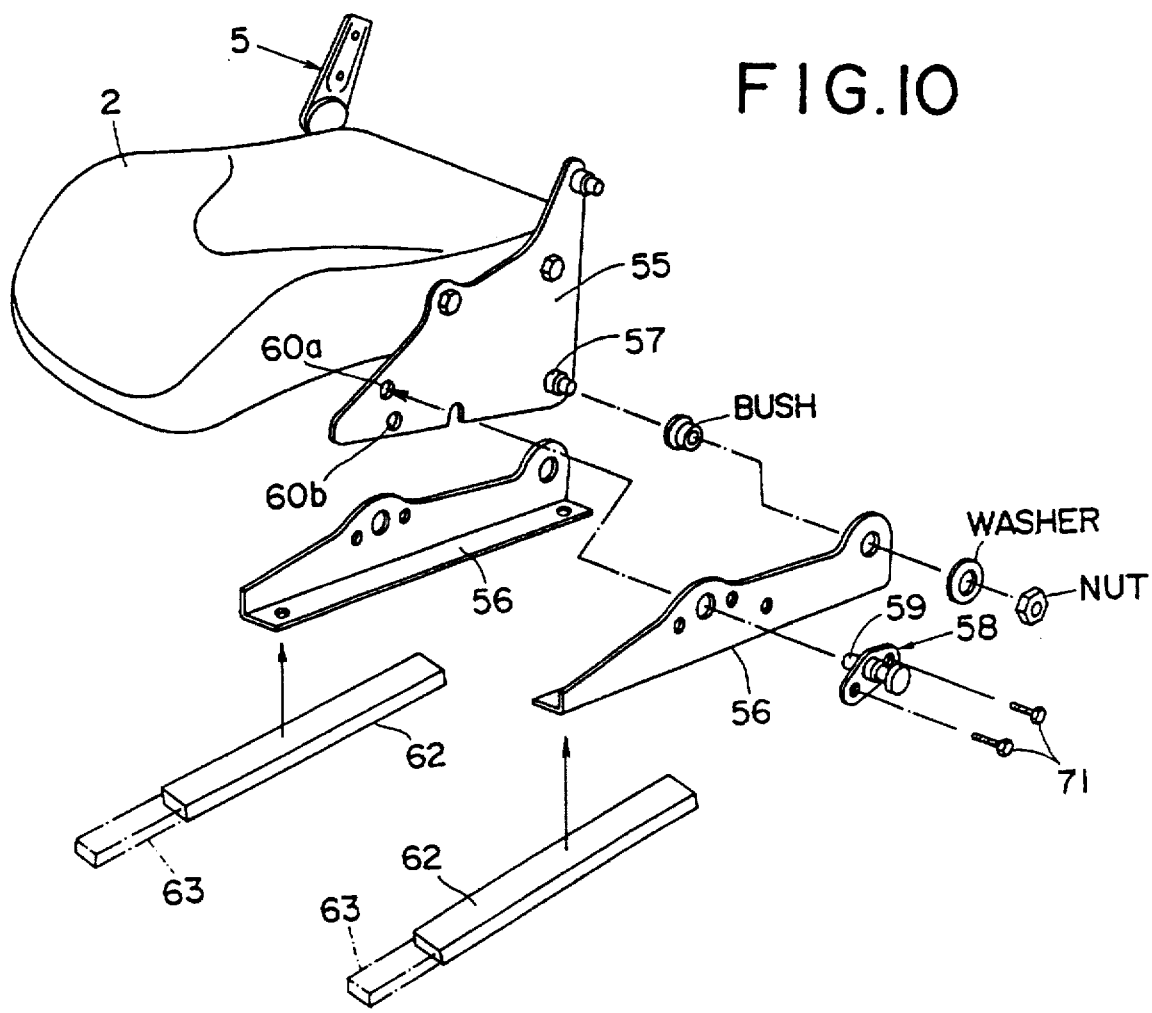
FIG. 10 is an exploded view of a height control means.

As shown in FIG. 10, a pair of upper brackets 55 are fixed to both sides of the frame assembly of the main seat portion 2. A shaft 57 is fixed to a lower-rear portion of each upper bracket 55, and rear portions of lower brackets 56 are rotatably attached to the shafts 57, respectively. The lower brackets 56 are fixed to the upper rails 62 which are slidably engaged with the lower rails 63 fixed to the vehicle body 80.

When the sub vehicle seat 15 is used, the vehicle seat 1 is desirably slid forward so as to increase the distance with a rear seat (not illustrated). When the vehicle seat 1 cannot be sufficiently slid forward due to the contact with a dashboard 65 of the vehicle 80 as shown by a imaginary line in FIG. 11, the headrest 12 and the main seat portion 2 are lowered. A height control means 58 for reducing the height of the seat portion 2 is, as shown in FIG. 10, fixed to the lower bracket 56 by screws 71. The height control means 58 has a locking pin 59 which selectively engages with an upper hole 60a and a lower hole 60b, both of which are formed on the upper bracket 55, due to the resiliency of a spring (not illustrated). When the locking pin 59 engages with the lower hole 60b, the main seat portion 2 is, as shown in the imaginary line in FIG. 11, held at a normal position which is suitable only to sit on the main seat portion 2 when backrest 4 is in an upright position. When the locking pin 59 engages with the upper hole 60a, a front side of the main seat portion 2 is rotated toward a floor board of the vehicle 80 about the shaft 57 as a center. In this position the main seat portion 2 is held at a low position in which the main seat portion 2 does not interfere with the dashboard 65.

The reclining device 5 disposed between the main seat portion 2 and the main backrest 4 has a fan-shaped gear 47 fixed to the frame assembly F, the ratchet lever 48 rotatably attached on the upper bracket 55 by a shaft 73 for meshing with the fan-shaped gear 47, and a release lever 51 for releasing the ratchet lever 48 from the fan-shaped gear 47. The fan-shaped gear 47 is comprised of a first toothed portion 49 for adjusting the angle of the main backrest 4, a second toothed portion 50 for holding the main backrest 4 at a retracted position in which the main backrest 4 is substantially in parallel with the main seat portion 2, and a non-toothed portion 74 disposed between the first toothed portion 49 and the second toothed portion 50.

The operation of this embodiment will be described hereinbelow.

Figure 11:
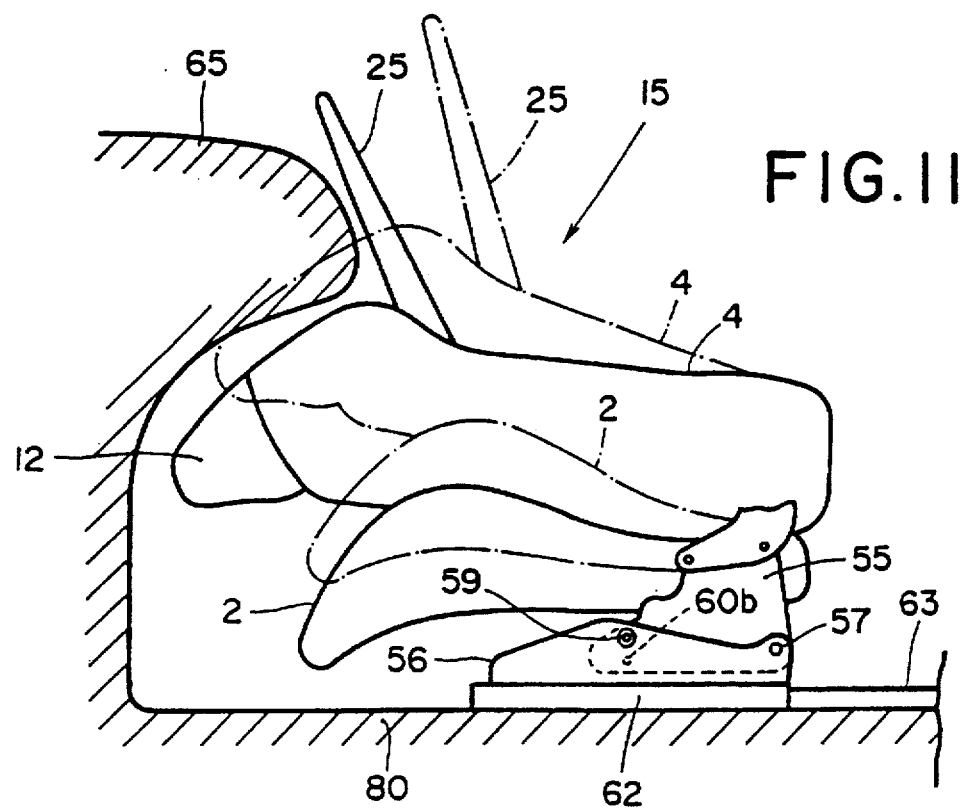
FIG. 11 is an explanatory view showing an operation of the height control means.
Figure 12:
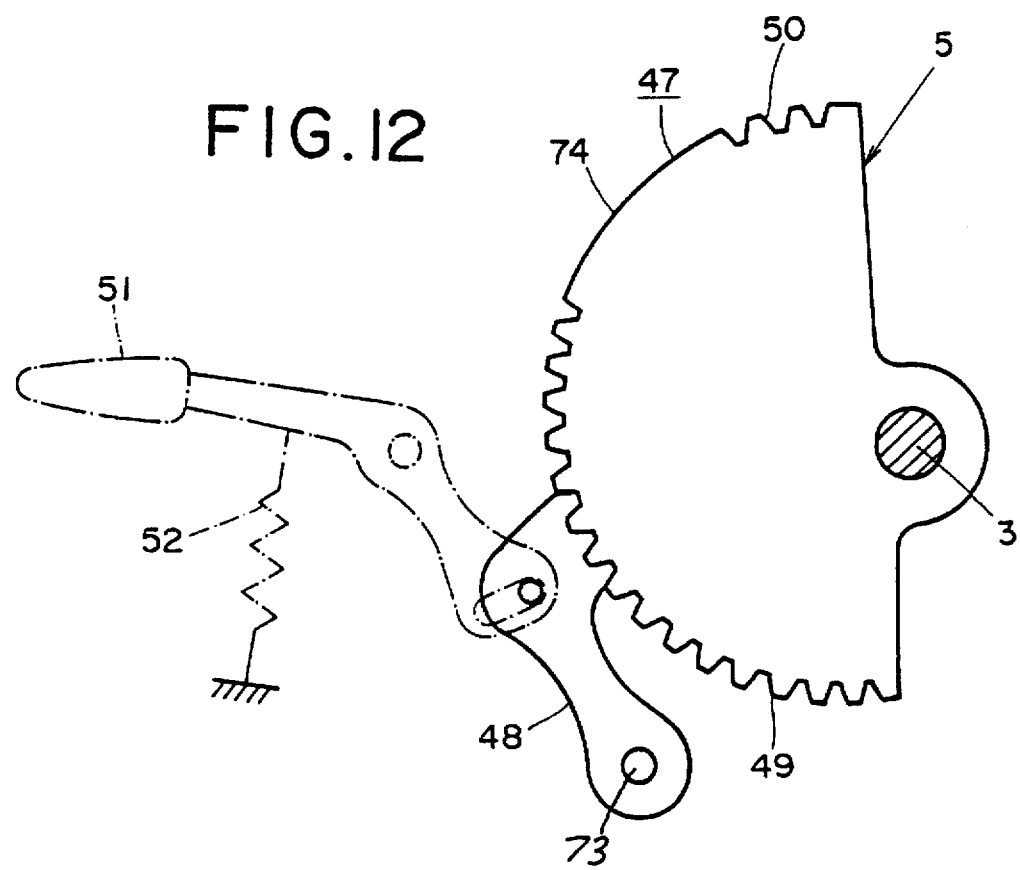
FIG. 12 is a side view of a reclining device.

When the retractable sub vehicle seat 15 is used, the release lever 51 of the reclining device 5 is rotated, and the ratchet lever 48 is released from the first toothed portion 49 of the fan-shaped gear 47, and then the main backrest 4 is rotated so as to be in parallel with the main seat portion 2. Next, when the release lever 51 is returned, the ratchet lever 48 is engaged with the second toothed gear 50, then the main backrest 4 is held in the horizontal state. The locking pin 59 of the height control means 58 is taken out of the lower hole 60b of the upper bracket 55, then inserted into the upper hole 60a. Thereby, after the main seat portion 2 is changed over from the normal position to the low position, the lower rail 63 and the upper rail 62 are unlocked, then the vehicle seat 1 is slid forward to the position shown in solid lines in FIG. 11. The main seat portion 2 positioned at the low position can be slid forward without coming into contact with the dashboard 65 as shown in FIG. 11.

Next, the operating knob 68 of the sub vehicle seat 15 is pushed, then the engaging portions 38 of the locking spring 35 are released from the first grooves 33 of the locking plates 31, and then the sub backrest 25 of the sub vehicle seat 15 is rotated about the shaft 30 as a center until the rear or outer surface of the sub backrest 25 comes into contact with the supporting wall 44 of the backrest 4. When the rear surface comes into contact with the supporting wall 44, the engaging portions 38 of the locking spring 35 are engaged with the second grooves 34 of the locking plates 31, then the sub backrest 25 is held at the upright position. When the cushion pad 20 in the recess 16 is transferred from the dent portion 19 to the bulged portion 72, the sub vehicle seat 15 becomes usable.

According to the sub vehicle seat 15 of the present invention, the bottom of the recess 16 is used as the sub seat portion 17. When the sub seat portion 17 is disposed on the dent portion 19 for supporting the buttocks of the passenger and the bulged portion 72 for supporting the femoral region of the passenger, a comfortable feeling of sitting is provided. However, since another cushion pad 20 can be attached to the recess 16, the comfortable feeling of sitting thereon is maintained even when the thickness of the rear cushion 18 of the sub seat portion 17 is insufficient to form the bulged portion 72.

Further, since the cushion pad 20 is formed to enter into the portion between the sub backrest 25 and the dent portion 19, the handling thereof is convenient when the sub backrest 25 is retracted in the recess 16.

Figure 13:
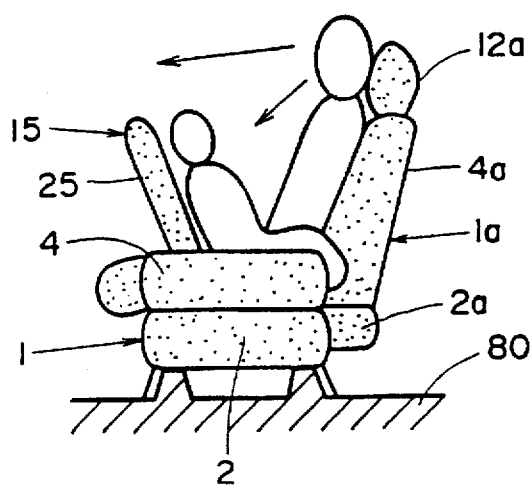
FIG. 13 is an explanatory view showing a relationship between a driver and a passenger who sits on the retractable sub vehicle seat.

In addition, when the child sits on the sub vehicle seat 15, the driver can easily watch the child, as shown in FIG. 13.

What is claimed is:

1. A vehicle seat with a retractable sub vehicle seat, comprising:

a main seat portion attached to a vehicle body;

a main backrest rotatably attached to the main seat portion;

said retractable sub vehicle seat having a recess formed on a rear side of the main backrest for receiving buttocks of a passenger and a sub backrest rotatably attached to the main backrest, said sub backrest being displaceable between a retracted position in which the sub backrest is substantially in parallel with the main backrest and is accommodated within the recess and an upright position in which the sub backrest is substantially perpendicular to the main backrest;

a locking mechanism for holding the sub backrest in the retracted position or the upright position;

wherein said main backrest has a frame assembly rotatably attached to the main seat portion, a front cushion section attached to a front side of the frame assembly for supporting a back of a passenger who sits on the main seat portion, and a rear cushion section attached to a rear side of the frame assembly, said rear cushion section being positioned in a bottom of the recess for supporting the buttocks of the passenger who sits on the recess;

wherein a supporting wall engages a rear surface of the sub backrest to support the sub backrest when the sub backrest is displaced into the upright position, said supporting wall being formed on a peripheral wall of the recess.

2. A vehicle seat according to claim 1, wherein said main backrest comprises a main supporting portion for supporting a back of the passenger who sits on the main seat portion and side supporting portions located on both sides of the main supporting portion, wherein said recess is formed on a rear side of the main supporting portion below an upper portion of the main supporting portion, wherein said supporting wall is formed on a lower surface of the upper portion.

3. A vehicle seat according to claim 1, wherein a dent portion for supporting the buttocks of the passenger and a bulged portion for supporting thighs of the passenger are formed on the rear section.

4. A vehicle according to claim 1, wherein said locking mechanism comprises a locking plate having a first groove and a second groove fixed to the sub backrest, and a locking spring attached to the main backrest and selectively engaged with the first groove and the second groove; wherein said locking spring comprises an attaching portion attached to the frame assembly by a fastener, a contacting portion resiliently coming into contact with the frame assembly, and an engaging portion resiliently engaging with the locking plate due to a contact of the frame assembly and the contacting portion.

5. A vehicle seat according to claim 4, wherein an outer end of said locking spring protrudes toward outside of the main backrest, wherein an operating knob is attached to an exposed portion of the outer end.

6. A vehicle seat with a retractable sub vehicle seat, comprising:

a main seat portion attached to a vehicle body;

a main backrest rotatably attached to the main seat portion;

said retractable sub vehicle seat having a recess formed on a rear side of the main backrest for receiving buttocks of a passenger and a sub backrest rotatably attached to the main backrest, said sub backrest being displaceable between a retracted position in which the sub backrest is substantially in parallel with the main backrest and is accommodated within the recess and an upright position in which the sub backrest is substantially perpendicular to the main backrest;

a locking mechanism for holding the sub backrest in the retracted position or the upright position;

wherein said main backrest has a frame assembly rotatably attached to the main seat portion, a front cushion section attached to a front side of the frame assembly for supporting a back of a passenger who sits on the main seat portion, and a rear cushion section attached to a rear side of the frame assembly, said rear cushion section being positioned in a bottom of the recess for supporting the buttocks of the passenger who sits on the recess;

wherein a cushioned dent portion for supporting the buttocks of the passenger and a cushioned bulged portion for supporting thighs of the passenger are formed on the rear cushion section; and the cushion dent portion has a supporting wall to engage a rear surface of the sub backrest in the upright position.

7. A vehicle seat according to claim 6, wherein said main backrest is slidably attached to the vehicle body, wherein a height control means for reducing the height of the main seat portion is disposed between the main seat portion and the vehicle body to permit the main seat portion to be moved below a dashboard of the vehicle body.

8. A vehicle seat according to claim 7, further comprising an upper bracket mounted to the main seat portion and a lower bracket slidably mounted to the vehicle body, wherein a rear end portion of said upper bracket and a rear end portion of said lower bracket are rotatably connected with each other by a shaft, wherein said height control means is disposed between a front end portion of the upper bracket and a front end portion of the lower bracket.

9. A vehicle seat according to claim 8, wherein said upper bracket comprises an upper hole and a lower hole arranged in the vertical direction, wherein said height control means comprises a locking pin selectively engaging with the upper hole and the lower hole.

10. A vehicle seat with a retractable sub vehicle seat, comprising:

a main seat portion attached to a vehicle body;

a main backrest rotatably attached to the main seat portion;

said retractable sub vehicle seat-having a recess formed on a rear side of the main backrest for receiving buttocks of a passenger and a sub backrest rotatably attached to the main backrest, said sub backrest being displaceable between a retracted position in which the sub backrest is substantially in parallel with the main backrest and is accommodated within the recess and an upright position in which the sub backrest is substantially perpendicular to the main backrest;

a locking mechanism for holding the sub backrest in the retracted position or the upright position;

wherein said main backrest has a frame assembly rotatably attached to the main seat portion, a front cushion section attached to a front side of the frame assembly for supporting a back of a passenger who sits on the main seat portion, and a rear cushion section attached to a rear side of the frame assembly, said rear cushion section being positioned in a bottom of the recess for supporting the buttocks of the passenger who sits on the recess;

wherein a cushion pad is attached to a rear surface of the rear cushion section, said cushion pad being accommodated in the dent portion when the sub backrest is positioned in the retracted position.

11. A vehicle seat with a retractable sub vehicle seat, comprising:

a main seat portion attached to a vehicle body;

a main backrest rotatably attached to the main seat portion;

said retractable sub vehicle seat having a recess formed on a rear side of the main backrest for receiving buttocks of a passenger and a sub backrest rotatably attached to the main backrest, said sub backrest being displaceable between a retracted position in which the sub backrest is substantially in parallel with the main backrest and is accommodated within the recess and an upright position in which the sub backrest is substantially perpendicular to the main backrest;

a locking mechanism for holding the sub backrest in the retracted position or the upright position;

wherein said main backrest has a frame assembly rotatably attached to the main seat portion, a front cushion section attached to a front side of the frame assembly for supporting a back of a passenger who sits on the main seat portion, and a rear cushion section attached to a rear side of the frame assembly, said rear cushion section being positioned in a bottom of the recess for supporting the buttocks of the passenger who sits on the recess;

wherein a supporting wall for supporting a rear side of the sub backrest when the sub backrest is displaced into the upright position is formed on a peripheral wall of the recess;

wherein said main backrest comprises a main supporting portion for supporting a back of the passenger who sits on the main seat portion and side supporting portions located on both sides of the main supporting portion, wherein said recess is formed on a rear side of the main supporting portion below an upper portion of the main supporting portion, wherein said supporting wall is formed on a lower surface of the upper portion;

wherein a dent portion for supporting the buttocks of the passenger and a bulged portion for supporting thighs of the passenger are formed on the rear cushion;

wherein a cushion pad is attached to a rear surface in the rear cushion section, said cushion pad being accommodated in the dent portion when the sub backrest is positioned in the retracted position.

* * * * *